United States Patent [19]
Shigeta et al.

[11] Patent Number: 5,302,432
[45] Date of Patent: Apr. 12, 1994

[54] AIR BAG

[75] Inventors: Seizaburo Shigeta, Funabashi; Katsuyoshi Kimoto, Kounosu, both of Japan

[73] Assignee: Asahi Kasei Kogyo Kabushiki Kaisha, Osaka, Japan

[21] Appl. No.: 847,044

[22] PCT Filed: Aug. 15, 1991

[86] PCT No.: PCT/JP91/01088
§ 371 Date: May 26, 1992
§ 102(e) Date: May 26, 1992

[87] PCT Pub. No.: WO92/03310
PCT Pub. Date: Mar. 5, 1992

[30] Foreign Application Priority Data
Aug. 16, 1990 [JP] Japan ................... 2-214952

[51] Int. Cl.$^5$ .............................. B29D 22/00
[52] U.S. Cl. .................... 428/36.1; 280/728 R; 428/102; 428/192; 428/193; 428/246; 428/252; 428/284; 428/287
[58] Field of Search .............. 428/246, 252, 287, 284, 428/36.1, 102, 192, 193; 280/728

[56] References Cited

U.S. PATENT DOCUMENTS 3,705,645 12/1972 Konen ........................ 206/46 R
5,110,666 5/1992 Menzel et al. ............... 428/36.1

FOREIGN PATENT DOCUMENTS 0380699 8/1989 European Pat. Off. .
1-25446 1/1989 Japan .
1-41439 2/1989 Japan .
2-225155 2/1989 Japan .

OTHER PUBLICATIONS

Supplementary European search report application No. EP 91 91 4623, dated Jul. 20, 1993.
Patent Abstracts of Japan, vol. 013405, Publication No. JP1148537, Sep. 6, 1989 for "Composite Cloth" by Yasue Masaharu et al.
Patent Abstracts of Japan, vol. 013094, Publication No. JP63286331, Nov. 24, 1988 for "Building Material sheet Permeable To Water Vapor" by Moriguchi Kisoo et al.
Patent Abstracts of Japan, vol. 013183, Publication No. JP1014023, Jan. 18, 1989 for "Manufacture of Composite Film Permeable to Gas" by Kagawa Seiji.

*Primary Examiner*—James J. Bell
*Attorney, Agent, or Firm*—Finnegan, Henderson, Farabow, Garrett & Dunner

[57] ABSTRACT

An airbag (1) constituted by using a laminated cloth comprising a woven fabric (2a) of synthetic fiber multi-filaments, a film (3) of a polyolefin group resin laminated on a side of the woven fabric (2a) and a nonwoven fabric (4) laminated on the film (3). The laminated cloth has a weight per unit area of 280 g/m$^2$ or less and an air permeability of 2 cc/cm$^2$ or less. The air bag having the constitution in accordance with the present invention has synthetically superior characteristics as an air bag for a driver's seat, a passenger's seat, or others, in a vehicle.

14 Claims, 5 Drawing Sheets

AIR BAG

DESCRIPTION

1. Technical Field

This invention relates to an air bag. More specifically, the invention relates to an air bag of an air bag system used to prevent injury to the human body caused by a collision, etc., of an automative vehicle.

2. Prior Art

The air bag system is constituted by a sensor for detecting a collision of the vehicles, a gas generator for expanding an air bag in response to a signal from the sensor, and the air bag expanded with gas for absorbing any shock imposed on the passenger upon a collision.

The fundamental characteristics required by the air bag are a strength sufficient to resist an instant expansion, an air sealability, and a fire retardance. Also, in addition to the fundamental characteristics, the air bag is required to have a light weight, a compact-folding ability, and a low cost.

Various proposals have been made for a woven fabric capable of satisfying the above-mentioned requirements of the air bag. For example, Japanese Unexamined Patent Application (Kokai) No. 49-47692 disclosed a coated cloth comprising a woven fabric coated with an elastomer having a fire retardance, such as a chloroprene. Although it is possible to obtain the woven fabric satisfying the above fundamental characteristics from this coated cloth, by suitably selecting the woven fabric and coating process conditions, when the elastomer is coated by the coating process, it is difficult to uniformly coat a small quantity of the elastomer on the woven fabric due to irregularities of a surface of the woven fabric, and thus a coating quantity of the elastomer may differ from 50 g/m$^2$ to 100 g/m$^2$, and accordingly, only a cloth having a heavy weight per unit area is obtained. Further, the whole cloth may become hard to handle due to a permeation of a solvent of the coating liquid, and further, this method has a problem in that bubbles are formed when applying the coating treatment to the woven fabric, and these bubbles are blown away during the drying of the coating cloth, and thus results in a lowering of the air sealability.

Japanese Unexamined Utility Model Publication (Kokai) No. 54-51749 disclosed an example using a woven fabric and a film, for forming the air bag, but the woven fabric and the film are not integrated, and accordingly, when a strong force is suddenly applied to the film, the film is easily broken. Further, this air bag has a problem in that a volume of the folded air bag becomes bulky.

Further, when a portion of the bag in contact with a human body, especially the skin of the face of the passenger, is formed of the woven fabric, the face skin is liable to be injured upon an expansion of the air bag. To solve this problem, an air bag in which a soft outer layer capable of moving relatively against the cloth of the air bag and arranged on an outer side thereof is proposed in Japanese Unexamined Utility Model Publication (Kokai) No. 62-43056. The air bag having a double structure such as this example, however, unpreferably has a heavy weight, a high bulkiness and a high cost.

Japanese Unexamined Utility Model (Kokai) No. 2-91056 disclosed a cloth for an air bag having a nonwoven fabric on a side in contact with the face of the human body, to prevent injury to the face upon an expansion of the bag. In a cloth 71 for an air bag shown in FIG. 10, a coating layer 73 of a rubber or a synthetic resin is arranged on a side of a woven fabric 72, and a nonwoven fabric 74 is adhered in a dot-pattern state on another side of the woven fabric 72, by an adhesive 75. Accordingly, the cloth 71 is provided with a space 76 between the woven fabric 72 and the nonwoven fabric 74, and thus when the air bag is expanded, injury to the face can be prevented by the nonwoven fabric, and any shock of impact of the face of the passenger by contact with the air bag at a high speed is moderated by the presence of the space 76. This cloth for the air bag, however, also uses the coating layer 73, and accordingly the same problems arising as in the Japanese Unexamined Patent Publication (Kokai) No. 49-47692 described herebefore, i.e., that the cloth has a heavy weight per unit area and that the reliability of the air bag is poor, are not solved.

DISCLOSURE OF THE INVENTION

The object of the present invention is to provide an air bag satisfying synthetically all of the requirements for the air bag. More specifically, the fundamental characteristics of the air bag, such as a strong resistance to an instant expansion, an air sealability, a fire retardance or the like, and further, a light weight, a compact-folding ability, and a low price are satisfied.

The object of the present invention is attained by an air bag having at least one portion thereof formed with a laminated cloth and having a portion capable of accommodating a gas for expanding the air bag in an inside thereof, wherein said laminated cloth is comprised of a woven fabric of synthetic fiber multifilaments, a film of a polyolefin group resin laminated on a side of the woven fabric and a nonwoven fabric laminated on the film, and having a weight per unit area of 280 g/m$^2$ or less, said film being formed in such a manner that an air permeability of the laminated cloth is 2 cc/cm$^2$/min or less and is closely bonded to and integrated with a surface of the woven fabric and a surface of the nonwoven fabric by a molten resin of the polyolefin group.

The bag body of this air bag may be constituted by whole portions thereof or only a portion in contact with a passenger when the air bag is expanded with the laminated cloth. In the latter case, a portion opposite to a body of the vehicle may be constituted by an ordinary woven fabric, i.e., a woven fabric having air permeability, and thus the weight of the air bag can be reduced and it is unnecessary to provide vent holes usually required to exhaust an gas from an expanded air bag. Accordingly, it is possible to reduce the cost of the air bag by using the latter constitution.

When the air bag is constituted in such a manner that the nonwoven fabric of the laminated cloth is outside of the air bag, it is possible to preferably reduce the chance of injury to the human body upon the expansion of the air bag. Conversely, when the nonwoven fabric is used inside the air bag, it is possible to protect a film of a polyolefin group resin against a high temperature gas.

Preferably a woven fabric constituting the laminated cloth is manufactured by weaving a multifilament of a polyamide group or a multifilament of a polyester group, to add to the strength of the woven fabric and reduce manufacturing costs. A thickness of the multifilament may be selected from around 120$^d$ to around 1200$^d$, but the yarn used in the laminated cloth is not limited to the above multifilament as it is possible to use a yarn of any other fiber having a high strength, as a fiber constituting the woven fabric. A plain weave, a matt weave or the like may be used as the weave of the woven fabric, and a woven fabric having a weight per unit area of 100 g/m² to 200 g/m² can be used.

A polyamide fiber, a polyester fiber, a regenerated cellulose fiber or the like can be used as a fiber constituting the nonwoven fabric, but a fiber to be used for the nonwoven fabric is not limited to the above fibers. The nonwoven fabric is soft compared with the woven fabric, and accordingly, when the human body is in contact with the nonwoven fabric, there is little damage to the human body. A type of nonwoven fabric, i.e., a method of manufacturing the nonwoven fabric, is not limited to a specific nonwoven fabric. For example, a nonwoven fabric manufactured by applying a carding treatment to a staple fiber, a nonwoven fabric manufactured by a spun-bond method, a nonwoven fabric manufactured by a flash method, a nonwoven fabric manufactured by a melt blow method, or the like, can be used. A weight per unit area of the nonwoven fabric is 15 g/m² to 50 g/m², preferably 30 g/m² or less. A nonwoven fabric manufactured without using a binder, such as the spun bond nonwoven fabric, is preferable due to a good covering capability and a soft handling thereof.

To further reduce the weight of the air bag, it is preferable to use a laminated cloth comprising a woven fabric of synthetic fiber multifilaments and a film of a polyolefin group resin laminated on a side of the woven fabric, and having a weight per unit area of 265 g/m² or less, preferably 250 g/m² or less and in which the film formed in such a manner that an air permeability of the laminated cloth is 2 cc/cm²/min or less is closely bonded to and integrated with a surface of the woven fabric by the polyolefin group resin, as at least one portion of the air bag. When the weight of the air bag is reduced due to use of the above constitution, the possibility of injury to the human body upon expansion of the air bag is reduced, and accordingly problems arising because the nonwoven fabric is not used can be alleviated. Nevertheless, since a bare resin film is likely to be damaged by a protrusion or heat, and a talc applying treatment is required to reduce friction toward a surface of the resin, the above must be additionally considered.

BEST MODE OF CARRYING OUT THE INVENTION

An air bag in accordance with the present invention is characterized in that a novel laminated cloth is used in at least one portion of the air bag, as described herebefore. The present invention is applicable for the whole air bag in a vehicle including a driver's seat air bag having a circular shape portion for accommodating an expanding gas, a passenger's seat air bag or the like. The manufacture of the air bag is generally conducted by sewing a plurality of woven fabrics, but an air bag having a circular gas accommodating portion manufactured by using a hollow weave cloth with a double hollow weave pattern, to improve the properties of the air bag and reduce the manufacturing costs of the air bag is disclosed in Japanese Unexamined Patent Publication (Kokai) No. 1-25446, or the like.

The present invention is applicable to all air bag regardless of the manufacturing method used such as the sewing method, hollow weaving method or the like. Accordingly, first the present invention will be described with regard to an air bag for a driver's seat and manufactured by the sewing method, and another variation thereof will be described thereafter.

Figure 1:
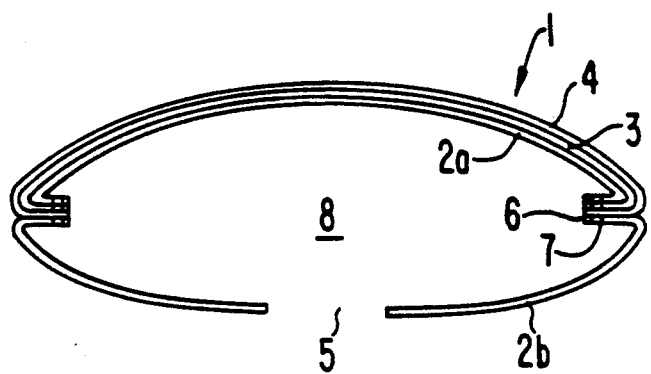
FIG. 1 is a cross sectional view illustrating an embodiment of an air bag for a driver's seat, in accordance with the present invention, and shows an example in which a laminated cloth having three layers is used in a state such that a nonwoven fabric is arranged outside of the air bag at a portion opposite to the passenger.

FIG. 1 shows a cross sectional view of the air bag for the driver's seat, in accordance with the present invention, and using a laminated cloth in a state such that a nonwoven fabric is arranged inside of the air bag at a portion opposite to the passenger.

In an air bag 1 shown in FIG. 1, a laminated cloth in which a woven fabric 2a of a synthetic fiber is used inside thereof, a film 3 of a polyolefin group resin is laminated on an outside of the woven fabric 2a, and a nonwoven fabric 4 is laminated on the film 3 at a portion opposite to a passenger when the air bag is mounted to a body of a vehicle, a woven fabric 26 of the synthetic fiber is used at a portion opposite to the body of the vehicle, circumferential edges 6 of the laminated cloth and the woven fabric 2a are bonded to each other by sewing with several raws of sewing threads 7, to form a portion 8 for accommodating an expanded gas, and an opening 5 for attaching an inflator is provided at a center of the woven fabric 2b arranged in the portion opposite to the body of the vehicle.

Figure 2:
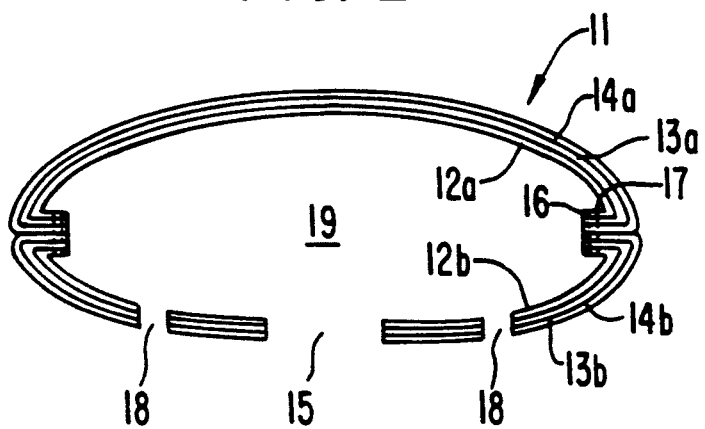
FIG. 2 is a cross sectional view illustrating another embodiment of an air bag for a driver's seat, in accordance with the present invention, and shows an example in which a laminated cloth having three layers is used in a state such that a nonwoven fabric is arranged outside of the air bag at portions opposite to a passenger and to a body of a vehicle.

Another air bag for the driver's seat in accordance with the present invention is shown in FIG. 2. The air bag 11 for the driver's seat shown in FIG. 2 is different from the embodiment shown in FIG. 1 in that the laminated cloth is also used at a portion opposite to the body of the vehicle. Namely, a laminated cloth in which a woven fabric 12a of a synthetic fiber is used inside thereof, a film 13a of a polyolefin group resin is laminated on an outside of the woven fabric 12a, and a nonwoven fabric 14a is laminated on the film 13a is used at a portion opposite to a passenger, a laminated cloth in which a woven fabric 12b of a synthetic fiber is used inside thereof, a film 13b of a polyolefin group resin is laminated on an outside of the woven fabric 12b, and a nonwoven fabric 14b is laminated on the film 13b is used at a portion opposite to the body of the vehicle, and circumferential edges 16 of the each laminated cloths are bonded to each other by sewing with several raws of sewing threads 17, to form a portion 19 for accommodating an expanded gas. An opening 15 for attaching an inflator is provided at a center of the laminated cloth arranged in the portion opposite to the body of the vehicle, and several vent holes 18 are provided in this laminated cloth.

As can be easily seen when comparing FIG. 1 with FIG. 2, since a cloth in the portion opposite to the body of the vehicle is the synthetic fiber woven fabric 2b having an air permeability, it is possible to reduce the weight of the air bag shown in FIG. 1, and an exhausting of a gas after the air bag is expanded can be conducted through the synthetic fiber woven fabric 2b arranged on the portion opposite to the body of the vehicle, and as a result, it is unnecessary to provide vent holes in this air bag. This usefully lowers the manufacturing cost of the air bag.

The air permeability of the woven fabric is intercepted by the film of polyester group resin in the air bag in accordance with the present invention. Since a woven fabric of synthetic fiber is arranged inside of the resin film in the air bag shown in FIG. 1, a high temperature gas generated during an operation of the air bag system cannot directly impact on the film of the polyolefin resin, and thus there is little possibility of the resin film being damaged by the high temperature gas. A nonwoven fabric is arranged at an outside portion of the resin film, and since this nonwoven fabric is soft compared with the synthetic fiber woven fabric used as a base fabric of the air bag, there is little chance that the human body, more specifically, the face, will be injured.

A high-density polyethylene resin, a low-density polyethylene resin, a polypropylene resin, an ethylene polypropylene copolymer resin, an ethylene-vinyl acetate copolymer resin, an ionomer resin and a mixed resin thereof can be used as the polyolefin group resin, but it is not limited to the above resins. Although it is possible to use the above resins when a film can be made from those resins by an extruding process, preferably the resin has a melt flow index MI of 1 g/min or more, more preferably 15 g/min or more, to attain a good laminated-moulding capability. The above MI is measured according to ASTM1238.

Figure 3:
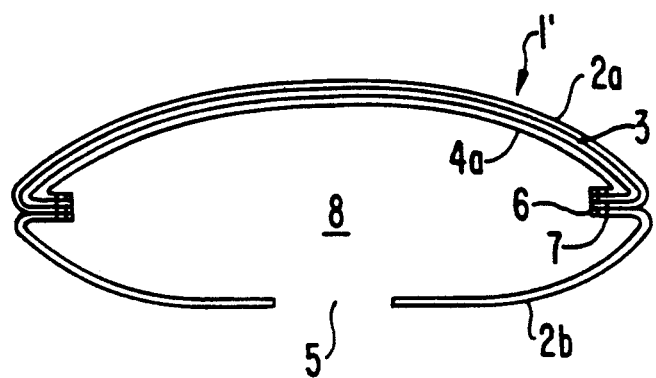
FIG. 3 is a cross sectional view illustrating an other embodiment of an air bag for a driver's seat, in accordance with the present invention, and shows an example in which a laminated cloth having three layers is used in a state such that a nonwoven fabric is arranged inside of the air bag at a portion opposite to the passenger.

A further air bag for the driver's seat in accordance with the present invention is shown in FIG. 3. The air bag 1' for the driver's seat shown in FIG. 3 is different from the air bag shown in FIG. 1 and uses a nonwoven fabric 4a at the expanded gas accommodating portion 8. In this case, damage to a polyolefin group resin film 3 caused by a high temperature gas generated upon an operation of the air bag system is prevented by the nonwoven fabric 4a.

Figure 4:
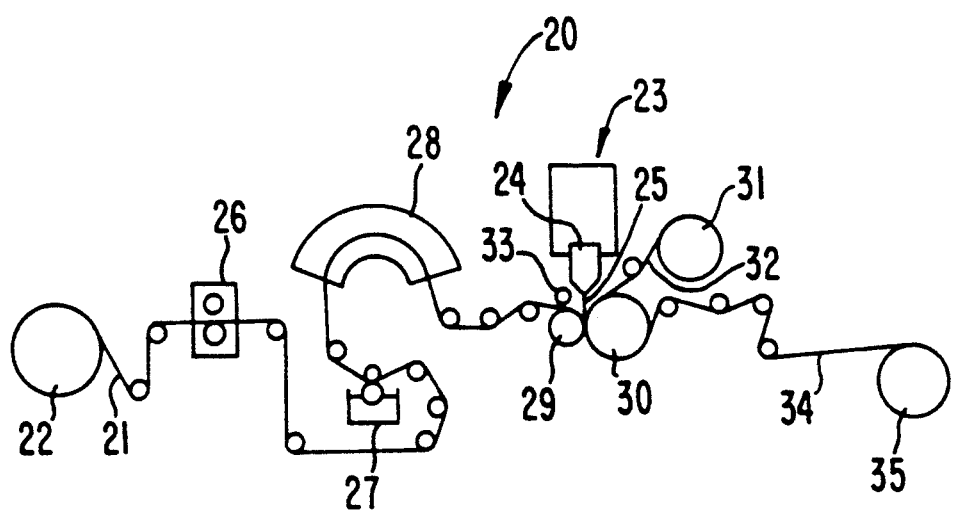
FIG. 4 is a schematic front view illustrating an apparatus for manufacturing a laminated cloth having three layers, in an air bag in accordance with the present invention.

Next, a preferable method of manufacturing the air bag in accordance with the present invention will be described with reference to FIG. 4. FIG. 4 shows an example of an apparatus for manufacturing a laminated cloth having three layers.

A fundamental constitution of a method of using a laminated cloth manufacturing apparatus 20 shown in FIG. 4 is comprised of a step of laminating a face of a sheet-like molten resin 25 of the polyolefin group resin extruded from a T-die 24 of an extruder 23 onto a woven fabric 21 of a synthetic fiber multifilament unwound from a beam 21 in a state such that the face of the sheet-like molten resin 25 is in contact with the woven fabric 21, a step of laminating simultaneously a nonwoven fabric 32 unwound from a beam 31 on another face of the sheet-like molten resin 25 in a state such that the nonwoven fabric 32 is in contact with the face of the sheet-like molten resin 25, a step of pressing the laminated material by passing same through a pair of rolls 29 and 30, and a step of winding the obtained laminated cloth on a beam 35.

In the apparatus 20 shown in FIG. 4, the sheet-like molten resin 25 of the polyolefin resin extruded from the T-die 24, the woven fabric 21 supplied along the roll 29 and the nonwoven fabric 34 supplied along the roll 30 are simultaneously laminated by being supplied to a nip line of the rolls 29 and 30, but a method of laminating the sheet-like molten resin on either one of the woven fabric and the nonwoven fabric, and then laminating another one of the nonwoven fabric or the woven fabric on another face of the sheet-like molten resin may be used.

It is preferable to apply a treatment for increasing the adhesive force to either one or two, or all of the woven fabric, the nonwoven fabric or the sheet-like molten resin, prior to the laminating process.

Various methods can be used for the adhesive force increasing treatment. In the apparatus 20 shown in FIG. 4, the adhesive force of the woven fabric against the resin is heightened by oxidizing a surface of the woven fabric 21 by a corona discharge device 26, and by applying an anchor coating azent to the woven fabric by an anchor coating apparatus 27. An alkyltitanate group, a polyisocyanate group, a polyethylene-imine group or the like can be used as a typical adhesive force increasing agent. The pick up when the polyethylene-imine group is used as the anchor coating agent is, for example, between 0.002 $g/m^2$ and 0.05 $g/m^2$, i.e., an extremely small quantity. When the anchor coating agent is applied, preferably the woven fabric is laminated with the sheet-like molten resin 25 after the treated woven fabric is dried by a dryer 28.

It is preferable to heighten the adhesive force of the sheet-like molten resin 25 by oxidizing a surface of the sheet of the polyethylene group resin by an ozone generating apparatus. Further, the adhesive force of the nonwoven fabric may be heightened by oxidizing a surface of the nonwoven fabric by an ozone generating apparatus (not shown).

Preferably one of the pair of rolls 29 and 30, e.g., the roll 30, is a cooling roll.

It is possible to use a resin other than the polyolefin group resin, e.g., a polyamide resin, a polyester resin or the like, for the resin film, but a change of a dimension of a film extruded from the T-die, i.e., a neck-in phenomenon, is large and results in a poor productivity of a film manufacturing process. It is possible to uniformly extrude an extremely thin film when using the polyolefin group resin and a uniform film having a thickness of around 15 μm can be formed when manufacturing the laminated cloth. As a result, it is possible to obtain a laminated cloth having a lighter weight and satisfactory properties.

Further, a method is known of adhering a preformed film to another material by using an adhesive, but since the adhesive percolates between filaments of the woven fabric, the obtained laminated cloth becomes unpreferably hard and stiff when handling. Further, gaps between the filaments are embedded with the adhesive and the laminated cloth itself may become a material having a flammability, and thus this laminated cloth cannot possibly satisfy a flame retardant regulation according to FMVSS (Federal Motor Vehicle Safety Standard) 302.

The laminated cloth used for the air bag in accordance with the present invention and comprising the synthetic fiber woven fabric, the polyolefin group resin film and the nonwoven fabric can be manufactured by a relatively simple method comprising a process of melting and extruding a polyolefin group resin capable of melting at a relatively low temperature in a sheet-like form, simultaneously laminating, before or after, the synthetic fiber woven fabric on a face of the sheet-like molten resin and the nonwoven fabric on another face of the sheet-like molten resin, and applying a press treatment thereto. The obtained laminated cloth has an impermeability. Accordingly, the air bag in accordance with the present invention can be manufactured at a low cost compared with a conventional air bag coated with an elastomer, and pin holes caused by bubbles occurring during the laminating process are not generated. Further, the air bag is folded to be accommodated in the body of the vehicle, and accordingly, in the conventional air bag manufactured with the elastomer coating treatment, a detachifier such as a talc is applied to the elastomer to enable a rapid expansion of the air bag. Conversely, since the surface of the air bag in accordance with the present invention shown in FIGS. 1 to 3 is the woven fabric or the nonwoven fabric, the surface of the air bag requires no talc, and accordingly, it is possible to provide an air bag able to surely expand without using a high-price detachifier.

A portion integrated through the film of the polyolefin group resin with the nonwoven fabric in the thus obtained air bag has an air permeability according to the JIS-L-1096 fragile method of 2 cc/cm$^2$/min or less, and thus the impermeability of this portion can be sufficiently maintained and a weight per unit area of this portion can be made 280 g/m$^2$ or less. Further, the stiffness according to JIS-L-1096 of the laminated cloth is 10 cm or less, i.e., soft.

Figure 5:
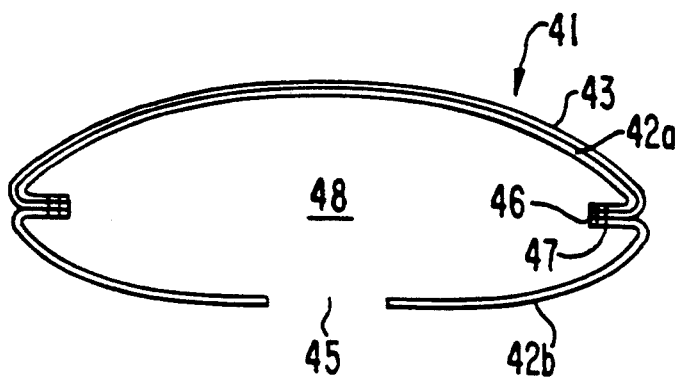
FIG. 5 is a cross sectional view illustrating another embodiment of an air bag for a driver's seat, in accordance with the present invention, and shows an example in which a laminated cloth having two layers is used in a state such that a nonwoven fabric is arranged outside of the air bag at a portion opposite to the passenger.
Figure 6:
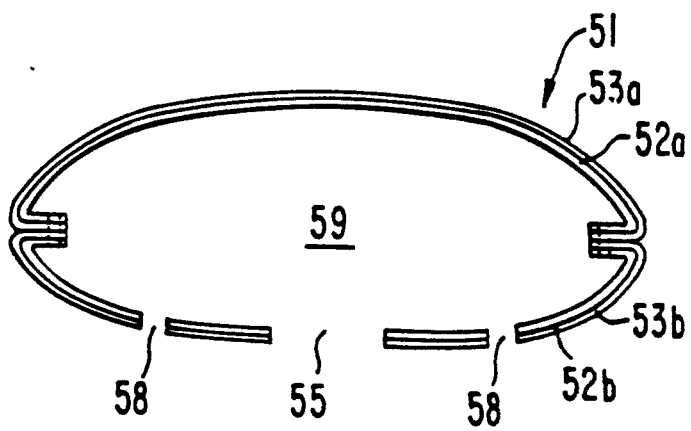
FIG. 6 is a cross sectional view illustrating another embodiment of an air bag for a driver's seat, in accordance with the present invention, and shows an example in which a laminated cloth having two layers is used in a state such that a nonwoven fabric is arranged outside of the air bag at portions opposite to a passenger and to a body of a vehicle.

Next, an air bag in accordance with the present invention and using a laminated cloth having two layers will be described with reference to FIG. 5 and FIG. 6. FIG. 5 is a cross sectional view corresponding to FIG. 1, and FIG. 6 is a cross sectional view corresponding to FIG. 2 and reference numbers having a suffix 40, as in the corresponding drawing, are used as reference numbers, respectively, for an easy understanding. As can be seen when comparing FIG. 1 with FIG. 5, and FIG. 2 with FIG. 6, a two layer laminated cloth does not use a nonwoven fabric (number 4 in FIG. 1, numbers 14a and 14b FIG. 2). In an air bag 41 in an embodiment shown in FIG. 5, a laminated cloth in which a synthetic fiber woven fabric 42a is arranged inside thereof and a polyolefin group resin film 43 is arranged outside thereof is used in a portion of the air bag opposite to a passenger when the air bag is expanded, and a woven fabric of a high tenacity synthetic fiber multifilament is used in a portion of the air bag opposite to a body of a vehicle, whereby an expanded gas accommodating portion is formed. Although an air bag 51 of an embodiment shown in FIG. 6 is different from the embodiment of FIG. 5, in that the laminated cloth having two layers is also used in a portion opposite to the body of the vehicle, i.e., a laminated cloth in which a synthetic fiber woven fabric 52a is arranged inside thereof and a polyolefin group resin film 53a is arranged outside thereof is used in a portion of the air bag opposite to the passenger, and a laminated cloth in which a synthetic fiber woven fabric 52b is arranged inside thereof, and a polyolefin group resin film 53b is arranged outside thereof, is used in a portion of the air bag opposite to the body of the vehicle, whereby an expanded gas accommodating portion 59 is formed.

Since the synthetic fiber woven fabric is arranged inside of the polyolefin group resin film in the two layers laminated cloth shown in FIGS. 5 and 6, the polyolefin group resin film is not damaged by a high temperature gas, and since the nonwoven fabric is not used, the weight of the laminated cloth can be reduced by a weight corresponding to that of the nonwoven fabric.

A method of manufacturing the two layers laminated cloth can be attained by eliminating a supply of the nonwoven fabric 32 used in the method of manufacturing the three layers laminated cloth described with reference to FIG. 4, and by supplying a sheet-like molten resin 25 of the polyolefin group resin extruded from T-die 24 on a face of the woven fabric 21 to laminate same in a state such that they are in contact with each other.

An air bag manufactured by a sewing process in accordance with the present invention has been described with reference to FIGS. 1 to 3, FIG. 5 and FIG. 6, but the present invention can be applied to an air bag manufactured from a hollow weave fabric. Namely, first a hollow weave cloth is woven by a double hollow weave pattern as disclosed in Japanese Unexamined Patent Publication No. 1-25446 and No. 2-225155, a polyolefin group resin film is formed on one side of the hollow weave cloth by using the apparatus shown in FIG. 4, and then a nonwoven fabric is laminated on the resin film, and thus an air bag of the hollow weave corresponding to the air bag in FIG. 1 is obtained in accordance with the present invention. Further, an air bag of the hollow weave corresponding to the air bag in FIG. 2 in accordance with the present invention can be obtained by applying the treatment using the apparatus shown in FIG. 4 on both sides of the hollow weave cloth. An air bag of the hollow weave corresponding to FIG. 3 can be obtained by turning inside-out the air bag corresponding to FIG. 1, through an opening for attaching an inflator (see FIG. 1).

Air bags corresponding to FIGS. 5 and 6 and in accordance with the present invention can be obtained by a method similar to that described before.

The hollow weave air bag is useful for reducing the manufacturing cost and improving the pressure resistance.

The present invention can be applied to an air bag for a passenger's seat as described before.

Figure 7:
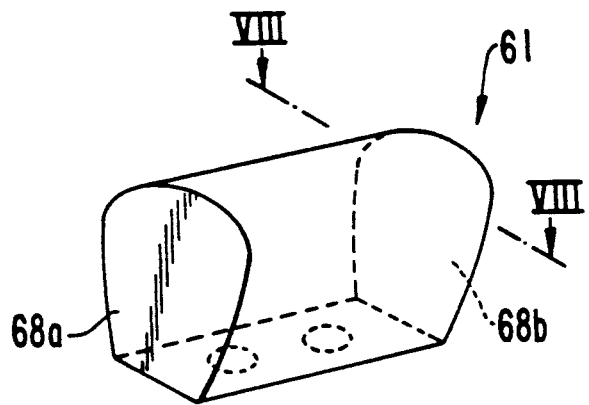
FIG. 7 is a perspective view illustrating a configuration of an air bag for a passenger's seat.
Figure 8:
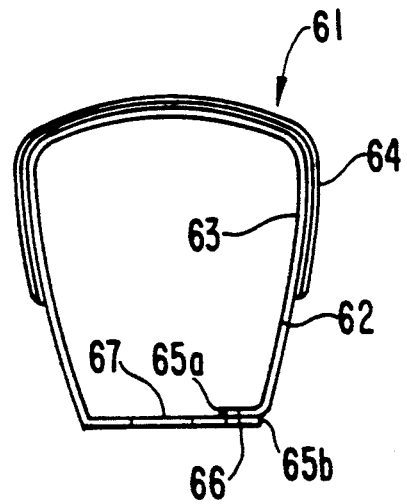
FIG. 8 is a cross sectional view illustrating an air bag for a passenger's seat, taken along the lines VIII to VIII of FIG. 7, and shows an example in which a laminated cloth having three layers is used in a state such that a nonwoven fabric is arranged outside of the air bag at a portion opposite to the passenger.
Figure 9:
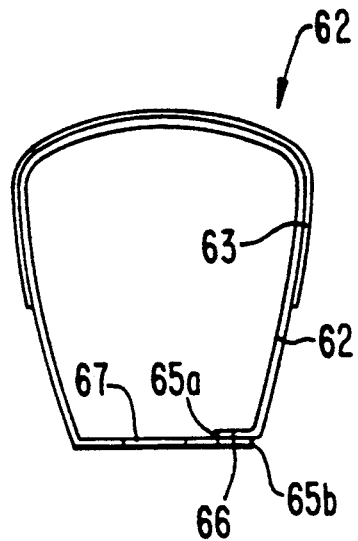
FIG. 9 is a same cross sectional view as that shown in FIG. 8 and illustrates another embodiment of an air bag for a passenger's seat, in accordance with the present invention, in which a laminated cloth having two layers is used in place of the laminated cloth having three layers; and, FIG. 10 is a cross sectional view illustrating an example of conventionally known laminated cloth for an air bag.
Figure 10:
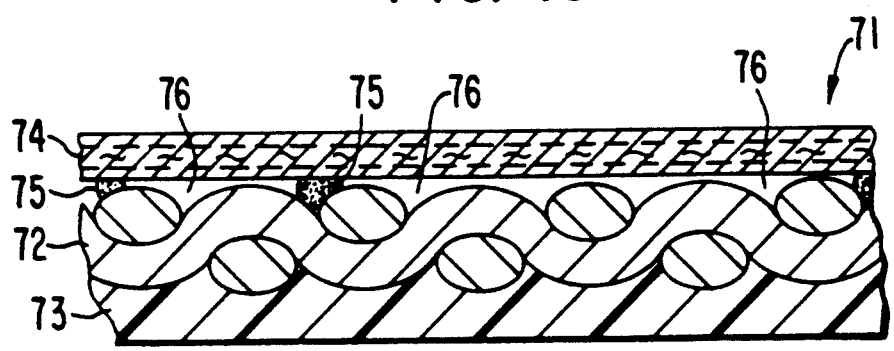

FIG. 7 shows a perspective view of an example of a bag body of the air bag for the passenger's seat. In an air bag 61 for the passenger's seat in accordance with the present invention, as shown in a cross sectional view (FIG. 8) in a plane taken along the arrows VIII—VIII in FIG. 7, a laminated cloth comprising a synthetic fiber woven fabric 62, a polyolefin group resin film 63 arranged on an outside of the woven fabric 62 and a nonwoven fabric 64 arranged on an outside of the resin film 63, is arranged on a portion opposite to a passenger when the air bag is mounted in a body of a vehicle. Further, a portion provided with an opening 67 for attaching an inflator is formed by a synthetic fiber woven fabric 62. At least upper portions of end cloths 68a, 68b of the air bag 61 for the passenger's seat may be constituted by the laminated cloth. A partially laminated structure of the air bag 61 for the passenger's seat shown in FIG. 8 may be obtained by laminating the polyolefin group resin film and the nonwoven fabric on the outerside of the synthetic fiber woven fabric 62 prior to sewing the end portions 65a and 65b with a plurality of raws of sewing threads 86, or by individually preparing the laminated cloth and the synthetic fiber woven fabric and then bonding the two materials to each other by sewing or the like (not shown).

It is possible to form all of the cloths constituting the air bag shown in FIG. 3 with the laminated cloth comprised of the woven fabric, the polyolefin group resin film, and the nonwoven fabric.

Further, the nonwoven fabric of the laminated cloth may be arranged inside of the air bag for the passenger's seat, as for the air bag 1' for the driver's seat (not shown).

The polyolefin group resin film 63 is only arranged on an outside of the synthetic fiber woven fabric in an air bag 62 for the passenger's seat. This air bag is also an air bag having a light weight the same as that of the air bag 41 for the driver's seat shown in FIG. 5.

EMBODIMENT

The air bag in accordance with the present invention will be described hereafter on the basis of the following examples.

First, examples of the laminated cloth will be described.

Three Layers Laminated Cloth (Example 1 to 8, Comparative Example 1)

The three following woven fabrics are prepared as the synthetic fiber multifilament woven fabric.
 1. Nylon 66 multifilament (Asahi Kasei K. K. Leona ®)
  Denier: 840 d/140 f
  Yarn density in fabric: 25 per inch (warp and weft)
  Weave: Plain weave
  Weight per unit area: 183 g/m²
 2. Nylon 66 multifilament (Asahi Kasei K. K. Leona ®)
  Denier: 420 d/70 f
  Yarn density in fabric: 46 per inch (warp and weft)
  Weave: Plain weave
  Weight per unit area: 169 g/m²
 3. Polyester multifilament (Asahi Kasei K. K.)
  Denier: 500 d/96 f
  Yarn density in fabric: 39 per inch (warp and weft)
  Weave: Plain weave
  Weight per unit area: 170 g/m²

The six following resins are prepared as the polyolefin group resin.
 a. High-density polyethylene resin
  Asahi Kasei Suntex F-180 (MI: 0.058/10 min.)
 b. Low-density polyethylene resin
  Asahi Kasei Suntex L-2340 (MI: 4.0 g/10 min.)
 c. Polypropylene resin
  Asahi Kasei Polypro F-1566 (MI: 8.0 g/10 min.)
 d. Ethylene-propylene copolymer resin
  Nihon Gosei Rubber EP-02P (MI: 3.2 g/10 min., Density: 0.86)
 e. Ethylene-vinyl acetate copolymer
  Asahi Kasei EL-0990 (MI: 8.5 g/10 min., Density: 0.926)
 f. Ionomer resin
  Mitsui Du Pont AM-6004 (MI: 10 g/10 min., Density: 0.94)

The three following nonwoven fabrics are prepared.
 A. Nonwoven fabric of Nylon 6 fiber and having a weight per unit area of 20 g/m².
 B. Nonwoven fabric of Nylon 66 fiber and having a weight per unit area of 25 g/m²,
 C. Nonwoven fabric of Polyester fiber and having a weight per unit area of 25 g/m².

Each laminated cloth is obtained under the combinations shown in Table 1 by an apparatus corresponding to an apparatus shown in FIG. 4. In this process, a corona treating machine of HF-4000 supplied by Taisei Sangyo Kabushiki Kaisha and having a voltage of 90 V, a grid current of 100 mA and an anode current of 2.5 A is used as a corona discharge device, a film-like molten resin having a thickness of 30 μm is extruded from a 90 mm extrusion laminator supplied by Toshiba Kabushiki Kaisha, a temperature of which is determined to be a predetermined value, e.g., 320° C. for the low-density polyethylene resin L-2340, the film is laminated to the woven fabric and the nonwoven fabric, and the film, the woven fabric and the nonwoven fabric are pressed against each other under a pressure of 2.5 kg/cm, to obtain laminated clothes for each example.

A cloth obtained by coating a chloroprene rubber on the nylon 66 multifilament woven fabric described in item 1 at a weight per unit area of 90 g/m² is prepared as a comparative example 1.

The characteristics of the obtained clothes of the examples and comparative example were measured, and the results are shown in Table 1.

TABLE 1

| | Combination | | | Weight per unit area (g/m²) | Comparison of weight per unit area | Stiffness | Bulkiness |
|---|---|---|---|---|---|---|---|
| | Woven fabric | Resin | Nonwoven fabric | | | | |
| Example 1 | 1 | a | A | 230 | 0.83 | 8 | 80 |

TABLE 1-continued

|  | Combination | | | Weight per unit area (g/m$^2$) | Comparison of weight per unit area | Stiffness | Bulkiness |
| --- | --- | --- | --- | --- | --- | --- | --- |
|  | Woven fabric | Resin | Nonwoven fabric | | | | |
| Example 2 | 1 | d | B | 225 | 0.82 | 7 | 77 |
| Example 3 | 2 | a | A | 235 | 0.86 | 8 | 82 |
| Example 4 | 2 | b | A | 228 | 0.83 | 8 | 80 |
| Example 5 | 2 | c | C | 245 | 0.89 | 10 | 83 |
| Example 6 | 2 | d | B | 248 | 0.90 | 8 | 85 |
| Example 7 | 3 | e | C | 248 | 0.90 | 9 | 86 |
| Example 8 | 3 | f | C | 245 | 0.89 | 9 | 87 |
| Comparative example 1 |  |  |  | 277 | 1.00 | 12 | 100 |

With regards to method of measuring the characteristics in Table 1, the stiffness is measured according to JIS-L-1096 stiffness A method (45° cantilever method), the bulkiness is obtained by folding two times the cloth of 20 cm × 20 cm along two axes which are perpendicular to each other, measured a thickness of the four folded cloth, and comparing the obtained values against the thickness of the cloth of the comparative example 1. A fire retardancy according to FMVSS302 method is good for each example, and an air permeability according to JIS-L-1096 fragile method is 2 cc/cm$^2$/min or less for each examples.

As shown in Table 1, the laminated clothes used for the air bag in accordance with the present invention have a lighter weight per unit area by around 10% to 18%, compared with the conventional coated cloth shown in the comparative example, a softer handling and a lower bulkiness. Accordingly, those clothes have properties capable of synthetically satisfying all the characteristics required as a cloth for the air bag. Further, since bubbles are not contained in the laminated cloth, the air bag obtained by using the laminated cloth has a high reliability.

Two Layers Laminated Cloth (Examples 9 to 17, Comparative Example 2)

The same types of the synthetic fiber woven fabric and the polyolefin group resin as used in the examples of the three layers laminated cloth are prepared, and each two layers laminated cloths are obtained under the combinations shown in Table 2 by an apparatus corresponding to an apparatus shown in FIG. 4. In this case, a corona treating machine HF-4000 supplied by Taisei Sangyo Kabushiki Kaisha and having a voltage of 90 V, a grid current of 100 mA, and an anode current of 2.5 A is used as a corona discharge device, a film-like molten resin having a thickness of 30 μm is extruded from an 90 mm extrusion-laminater supplied by Toshiba Kabushiki Kaisha a temperature of which is determined to be a predetermined value, e.g., 320° C. for the low-density polyethylene resin L-2340, the film is laminated with the woven fabric and the nonwoven fabric, and the film, the woven fabric and the nonwoven fabric are pressed against each other under a pressure of 2.5 kg/cm, to obtain a two layers laminated cloth for each example.

A cloth obtained by coating a chloroprene rubber on the nylon 66 multifilament woven fabric described in item 1 by a weight per unit area of 90 g/m$^2$ is prepared as a comparative example, as for the comparative example in the three layers laminated cloth.

The characteristics of the obtained clothes of the examples and the comparative example were measured, and the results are shown in Table 2.

TABLE 2

|  | Combination | | Weight per unit area (g/m$^2$) | Comparison of weight per unit area | Stiffness | Bulkiness |
| --- | --- | --- | --- | --- | --- | --- |
|  | Woven fabric | Resin | | | | |
| Example 9 | 1 | a | 212 | 0.77 | 7 | 78 |
| Example 10 | 1 | d | 205 | 0.75 | 6 | 75 |
| Example 11 | 2 | a | 215 | 0.78 | 6 | 80 |
| Example 12 | 2 | b | 228 | 0.83 | 5 | 78 |
| Example 13 | 2 | c | 216 | 0.79 | 7 | 80 |
| Example 14 | 2 | d | 225 | 0.82 | 6 | 83 |
| Example 15 | 3 | a | 228 | 0.83 | 9 | 83 |
| Example 16 | 3 | e | 223 | 0.81 | 8 | 85 |
| Example 17 | 4 | f | 220 | 0.80 | 7 | 83 |
| Comparative example 1 |  |  | 274 | 1.00 | 12 | 100 |

A fire retardancy according to the FMVSS302 method is good for each example, and an air permeability according to the JIS-L-1096 fragile method is 2 cc/cm$^2$/min or less for each example.

As shown in Table 2, the laminated cloths used for the air bag in accordance with the present invention have a lighter weight per unit area by around 20%, compared with the conventional coated cloth shown in the comparative example, a softer handling and a lower bulkiness. Accordingly, these clothes have properties capable of synthetically satisfying all of the characteristics required for the cloth for the air bag. Further, since bubbles are not contained in the laminated cloth, the air bag obtained by using the laminated cloth has a high reliability.

EXAMPLE 18

The circular cloths are prepared by cutting the laminated cloth obtained in the example 6 to a shape having a diameter of 750 mmφ, two vent holes having a diameter of 35 mmφ are opened in the circular cloth, an opening for attaching an inflator and having a diameter of 100 mmφ is arranged in a center of the same circular cloth, and a reinforcing cloth having a doughnut-like shape is fixed to a circumferential edge of the opening by a sewing operation, respectively. The two circular cloths are arranged in such a manner that the nonwoven fabric is arranged at an outside and bonded by sewing outer circumferential portions thereof to make a hollow portion, and a front side and a back side of the sewn two clothes are turned inside-out through the opening for attaching the inflator, to obtain an air bag of example 18.

The obtained air bag is light, i.e. 270 g, and compact, and has a burst strength of 2.1 kg/cm$^2$, and thus has sufficient properties. Although a talc for preventing tackiness of the cloth is not used, the tackiness does not appear under a severe durability test corresponding to the accommodation of the air bag.

The burst strength is a gauge pressure expressing an inner pressure of the air bag when $N_2$ gas under a high pressure is instantly introduced into the air bag to burst the air bag in an extremely short time such as 100 ms or less.

EXAMPLE 19

An air bag is prepared from the laminated cloth obtained by the example 12 by the same sewing operation as used in the example 18, but talc is applied to prevent tackiness before the turning inside-out operation. The obtained air bag is extremely light, i.e. 270 g, and compact, and has a burst strength of 2.0 kg/cm$^2$, and thus has a sufficient durability.

EXAMPLE 20

A double weave air bag cloth having several circular hollow portions having an inner diameter of 710 mm$\phi$ and spaced from each other in a warp direction and woven from a nylon multifilament 420 d/70 f with yarn density of a warp yarn and a weft yarn of 90 per inch is prepared. Peripheral portions of the circular hollow portions are bound by a single layer weave. A nonwoven fabric is laminated through a polyethylene resin film on a face of the double weave air bag cloth under the same condition as that of the example 18. A weight per unit area of the laminated portion of the cloth is 220 g/m$^2$ and it has an air permeability of 2 cc/cm$^2$/min or less.

An opening for attaching an inflator having a diameter of 100 mm$\phi$ is provided on a center of a face having no nonwoven fabric, and a reinforcing cloth having a ring like shape is bonded to an outside portion of the opening by an adhesive. An air bag of the example 20 obtained by burning inside-out through the opening for attaching the inflator has an exhausting face on a portion which is not laminated with the nonwoven fabric, is a light weight and an air bag capable of being accommodated in a compact state.

A weight of the air bag is light, i.e., 240 g a burst strength thereof is 2.2 kg/cm$^2$.

EXAMPLE 21

The laminated cloth obtained in example 1 is cut to form a circular cloth having a diameter of 750 mm$\phi$, and the woven fabric 1 used in the example 1 is cut to the same size as that of the circular laminated cloth, to thus obtain two circular cloths. An opening having a diameter of 100 mm$\phi$ for attaching an inflator is provided on a center of the woven fabric 1, a reinforcing cloth having a doughnut-like shape is sewn on an peripheral portion of the opening, and then peripheral portions of the two circular cloths are sewn to make the air bag having a hollow portion. A front side and back side of the air bag is turned inside-out through the opening for attaching the inflator, and thus the air bag shown in FIG. 1 is obtained.

The obtained air bag is light, i.e., 255 g, and has a burst strength of 2.0 kg/cm$^2$.

CAPABILITY OF EXPLOITATION IN INDUSTRY

An air bag in accordance with the present invention has a structure such that a prevention of a leakage of an expanding gas can be attained by a polyethylene resin film provided in place of a coating layer used in a conventional air bag. Accordingly, the air bag of the present invention is lighter and more compact. Further, it is possible to improve the protection of a passenger by arranging a nonwoven fabric in a portion opposite to the passenger. The air bag in accordance with the present invention has practically sufficient properties such as a pressure resistance or the like and superior synthetical properties including a cost of manufacturing the air bag. Accordingly, the air bag in accordance with the present invention can be broadly used in not only for driver's seat but in all other cases, as an air bag for a vehicle.

We claim:

1. An air bag for forming an internal space for accommodating an inflated gas for expanding the air bag, comprising:
   a laminated cloth forming at least a portion of the air bag;
   said laminated cloth comprising a woven fabric of synthetic fiber multifilament, a film of polyolefin group resin laminated on said woven fabric, and a nonwoven fabric laminated on said film;
   said film being closely bonded to and integrated with a surface of the woven fabric and a surface of the nonwoven fabric by a molten portion of said film which solidifies upon cooling such that an air permeability of the laminated cloth becomes 2 cc/cm$^2$/min or less; and
   said laminated cloth having a weight per unit area of 280 g/m$^2$ or less.

2. An air bag according to claim 1, wherein said laminated cloth is used for a whole portion of the air bag and a vent hole is provided in the laminated cloth.

3. An air bag according to claim 1, wherein said laminated cloth is used for at least one portion of the air bag and a woven fabric of synthetic fiber multifilaments is used for another portion of the air bag, said portions being sewn together.

4. An air bag according to claim 3, wherein said nonwoven fabric of the laminated cloth comprises the outermost layer of the laminated cloth.

5. An air bag according to claim 1, wherein said woven fabric portion of the laminated cloth is comprised of multifilaments of a polyamide group.

6. An air bag according to claim 1, wherein said woven fabric portion of the laminated cloth is comprised of multifilament of a polyester group.

7. An air bag according to claim 1, wherein said nonwoven fabric portion of the laminated cloth is comprised of a polyamide fiber.

8. An air bag according to claim 1, wherein said nonwoven fabric portion of the laminated cloth is comprised of a polyester fiber.

9. An air bag according to claim 1, wherein said nonwoven fabric portion of the laminated cloth is comprised of a regenerated cellulose fiber.

10. An air bag according to claim 1, wherein said film of the polyolefin group resin is formed by inserting a molten polyolefin group resin having a sheet-like shape between the woven fabric and the nonwoven fabric and laminating same together.

11. An air bag for forming an internal space for accommodating an inflated gas for expanding the air bag, comprising:

a laminated cloth forming at least a portion of the air bag;

said laminated cloth comprising a woven fabric of synthetic fiber multifilament, and a film of polyolefin group resin laminated on said woven fabric;

said film being closely bonded to and integrated with a surface of the woven fabric by a molten portion of said film which solidifies upon cooling such that an air permeability of the laminated cloth becomes 2 cc/cm$^2$/min or less; and said laminated cloth having a weight per unit area of 265 g/m$^2$ or less.

12. An air bag according to claim 11, wherein said laminated cloth is used for a whole portion of the air bag and a vent hole is provided in the laminated cloth.

13. An air bag according to claim 11, wherein said laminated cloth is used for at least one portion of the air bag and a woven fabric of synthetic fiber multifilaments is used for another portion of the air bag, said portions being sewn together.

14. An air bag according to claim 11, wherein said woven fabric portion of the laminated cloth is comprised of a multifilament of a polyester group.

* * * * *